United States Patent [19]

Ellen

[11] 3,961,715
[45] June 8, 1976

[54] TRUNK MOUNTED ROLLER FOR HANDLING HEAVY OBJECTS

[76] Inventor: Harry J. Ellen, 499 W. Missouri Ave., Phoenix, Ariz. 85013

[22] Filed: Apr. 2, 1973

[21] Appl. No.: 346,718

[52] U.S. Cl.................................. 214/84; 296/16; 224/42.1 H
[51] Int. Cl.² .......................................... B60P 1/00
[58] Field of Search................. 214/450, 83.24, 451, 214/84; 296/16, 26; 193/42

[56] References Cited
UNITED STATES PATENTS

| | | | |
|---|---|---|---|
| 2,468,925 | 5/1949 | De Boer | 296/16 |
| 2,788,137 | 4/1957 | Harkness | 214/83.24 |
| 2,859,887 | 11/1958 | Haight | 214/450 |
| 3,132,755 | 5/1964 | Greenslate | 214/450 |
| 3,381,835 | 5/1968 | Lee | 214/450 |
| 3,712,524 | 1/1973 | Ames | 214/450 |

*Primary Examiner*—Robert J. Spar
*Assistant Examiner*—Jerold M. Forsberg
*Attorney, Agent, or Firm*—Warren F. B. Lindsley

[57] ABSTRACT

A device mounted in the trunk of an automobile which facilitates the removal of heavy objects and reduces the hazard of muscle strain or back injury while such objects are being removed. The device employs a roller assembly which supports the weight of the objects as they are being removed.

1 Claim, 4 Drawing Figures

TRUNK MOUNTED ROLLER FOR HANDLING HEAVY OBJECTS

BACKGROUND OF THE INVENTION

The removal of suitcases and other heavy objects from the trunk of an automobile is often difficult because it is necessary to lean forward in an unbalanced position while having to lift the object high enough to clear the rear wall of the trunk and the trunk latch. This procedure can result in personal injury to the back or arms due to excessive strain. If the object is too heavy and fails to clear the rear wall of the trunk or the trunk latch, it may be damaged or damage some part of the automobile.

Manufacturers are becoming increasingly aware of the importance of designing products that are free of hazards to the user. In addition to the importance of avoiding lawsuits which may be filed by injured parties, manufacturers are also encountering government regulations requiring reasonable measures to insure product safety.

The difficulty of removing such heavy objects from the trunk of an automobile and the danger of such unpleasant consequences are especially acute for persons of small build or stature or for persons who are physically handicapped.

Therefore, a need exists for a device or apparatus which will make it easier to remove heavy objects from the trunk of an automobile and which will reduce the danger of bodily injury or property damage.

SUMMARY OF THE INVENTION

It is, therefore, an object of this invention to provide a device which will reduce the difficulty of removing heavy objects from the trunk of an automobile.

Another object of this invention is to provide a device which will reduce the hazard of bodily injury to persons removing heavy objects from the trunk of an automobile.

A further object of this invention is to provide a device which will reduce the hazard of damage to the object or to any part of the automobile while the object is being removed from the automobile.

A still further object of this invention is to provide a device which will enable a person of slight build or relatively limited physical strength to remove objects from the trunk of an automobile which he would otherwise be unable to handle.

A still further object of this invention is to provide such a device in a simple structure that can be inexpensively produced so that it can be made readily available to all who find it useful.

Further objects and advantages of the invention will become apparent as the following description proceeds and the features of novelty which characterize this invention will be pointed out with particularity in the claims annexed to and forming part of this specification.

BRIEF DESCRIPTION OF THE DRAWINGS

The present invention may be more readily described by reference to the accompanying drawing in which.

DESCRIPTION OF THE INVENTION

Figure 1:
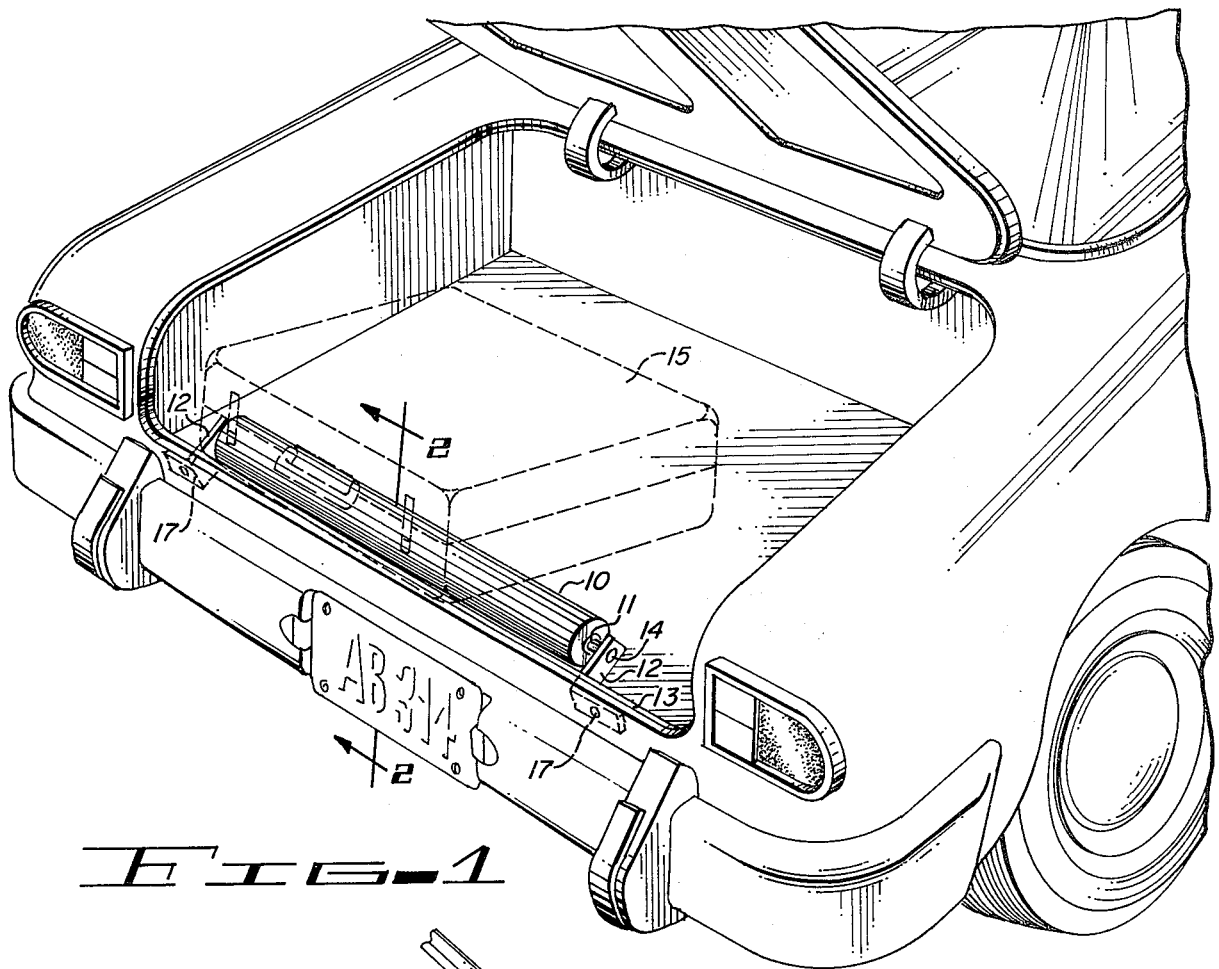
FIG. 1 is a perspective view of one embodiment of the invention installed in the trunk of an automobile.

Referring more particularly to the drawing by characters of reference, FIG. 1 discloses a roller 10 having an axle 11 mounted at each end by bracket members 12 to the rear wall 13 of an automobile trunk. The roller 10 may be made of rubber, plastic, wood, or other smooth or flexible material which will not scuff or mar objects with which it comes into contact with.

The axle 11 may be rigidly or fixedly mounted to the roller 10 in which case a circular opening 14 in bracket member 12 serves as a bearing surface. The axle 11 also may be fixedly attached to bracket member 12 in which case roller 10 is free to rotate on axle 11. The performance of the device may be enhanced by the incorporation of ball or roller bearings (not shown) or by the use of other recognized bearing assemblies in the circular opening 14 of bracket member 12.

As an illustration of the functioning of the device, a suitcase 15 may be grasped by its handle, tilted upward and drawn over roller 10 as it is removed from the trunk of the automobile. As the suitcase is being drawn over the roller, its weight is supported by the roller, and the force required to produce horizontal motion is made negligible by the free rotation of the roller. As the suitcase begins to clear the roller, the person removing the suitcase is well clear of the rear of the automobile and may readily maneuver the suitcase while standing in an upright position.

Figure 2:
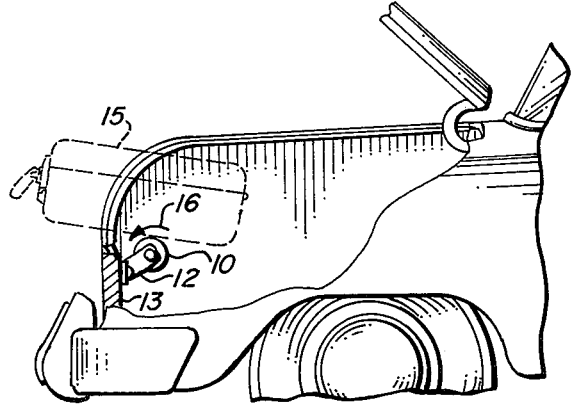
FIG. 2 is a cross-sectional view of FIG. 1 taken along the line 2—2.

In FIG. 2, suitcase 15 is shown partially removed and resting on the surface of roller 10 which rotates in the direction of arrow 16 as it is drawn out of the trunk of the automobile.

It will be appreciated that the device is equally useful in the moving of heavy objects into the trunk of the automobile. In this case the object is first placed in position on the roller and then thrust into the trunk as the roller supports its weight.

The mounting of bracket member 12 may be accomplished by a screw, bolt or rivet 17 to the rear wall 13 of the trunk of the automobile, as shown in FIG. 2. By a slight variation in the design of bracket member 12, it may be mounted on the floor of the trunk.

Figure 3:
FIG. 3 is a side view of a modification of the invention, shown in FIG. 1 illustratating a collapsible conveyor for moving luggage into and out of a trunk.
Figure 4:
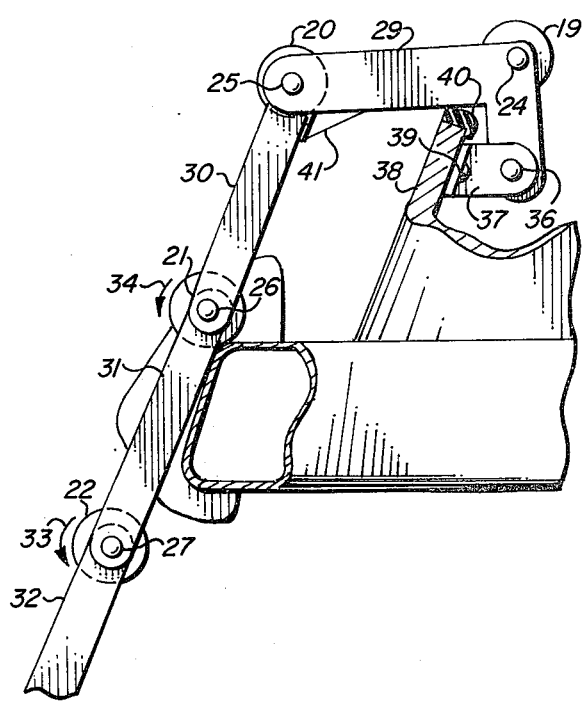
FIG. 4 is a side view of the conveyor shown in FIG. 3 in a folded or stowed position in the trunk of the car shown in FIG. 3.
Figure 4:
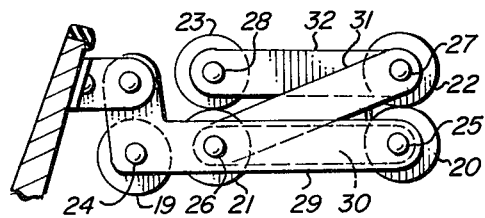

A second and more elaborate embodiment of the invention comprising a collapsible ramp or conveyor device 18 is shown in FIGS. 3 and 4. Device 18 comprises a plurality of rollers 19, 20, 21, 22 and 23 mounted by means of axles 24, 25, 26, 27 and 28 in a ramp or conveyor configuration by means of a pair of L-shaped links 29 and pairs of straight links 30, 31 and 32.

The links 29, 30, 31 and 32 are each provided with bearing holes which slip over the ends of axles 24, 25, 26, 27 and 28 and permit rotation of the links relative to each other. For example, link 32 may be moved to the position shown in FIG. 3 by rotating link 32 about axle 27 in the direction shown by arrow 33. Link 31 is similarly free to rotate relative to link 30 in a direction 34 to the ramp or conveyor extended position shown. Link 30 is free to rotate relative to link 29 in a counter clockwise direction. Link 29 is fitted with an axle 36 which is supported by a bracket 37. Bracket 37 is secured to the rear wall 38 of the trunk of an automobile by a screw, bolt or rivet 39. Link 29 has been rotated in a counter clockwise direction about axle 36 to the ramp or conveyor extended position shown. Further rotation of link 29 is limited either by the top surface 40 of the rear wall 38 of the trunk or preferably by a stop 41 which is fixedly attached to link 29 and which bears against the edge of link 30 in the ramp fully extended position.

The improved utility of the apparatus of FIGS. 3 and 4 over the simpler device of FIGS. 1 and 2 lies in its capability to provide a measure of support to the object being removed from the trunk throughout its full course of travel from the trunk to the ground as it rides first over rollers 19 and 20 and then down the ramp structure over rollers 21 and 22. It will be appreciated that the base of the ramp or conveyor structure may rest on the ground or it may rest on a loading platform or dock to which such heavy objects may be moved from the trunk of the automobile. For such use it should preferably be designed to lock rigidly in the fully open position. Again the loading operation as well as the unloading operation may be equally facilitated by the use of the apparatus described.

FIG. 4 shows the apparatus of FIG. 3 in the folded or stowed position. Stowing is accomplished by folding the links of the ramp structure in an accordion-like fashion with the links juxtapositioned to each other to the position shown in which it rests on the floor of the trunk. It will be appreciated that in the stowed position, the apparatus of FIG. 4 provides in a similar manner the same function provided by the simple device of FIGS. 1 and 2, namely that of aiding in supporting and moving the luggage in the trunk.

It should be recognized that the structure shown in FIGS. 3 and 4 may comprise only the L-shaped brackets or links 29 and the associated rollers 19 and 20 connected to brackets 37 as shown to effectively aid in loading and unloading luggage from the trunk of the automobile. The L-shaped links and their rollers may pivot into and out of the trunk for storage and loading purposes.

Although but two embodiments of the present invention have been illustrated and described, it will be apparent to those skilled in the art that various changes and modifications may be made therein without departing from the spirit of the invention or from the scope of the appended claims.

What is claimed is:

1. A device for mounting in the trunk of an automobile for aiding in loading and unloading luggage therefrom comprising:

a pair of brackets for spacedly mounting within the opening of the trunk for supporting a roller substantially perpendicular to the longitudinal axis of the automobile, juxtapositioned to its rear bumper and with its bearing ends extending slightly above the periphery of the opening of the trunk, the periphery of which opening along the floor of the trunk extends above the floor of the trunk, and a roller mounted on said ends of said brackets to extend therebetween above the floor of the trunk and the periphery of the opening of the trunk adjacent the floor of the trunk for rotation thereon, and said roller being positioned so that a part of its outer surface extends above the edge of the periphery of the juxtapositioned opening of the trunk so that luggage can be moved over said roller without engaging the periphery of said edge of said opening.

* * * * *